Aug. 23, 1927.
C. JAMES
1,640,238
CORN PLANTER
Filed Dec. 14, 1925
5 Sheets-Sheet 1
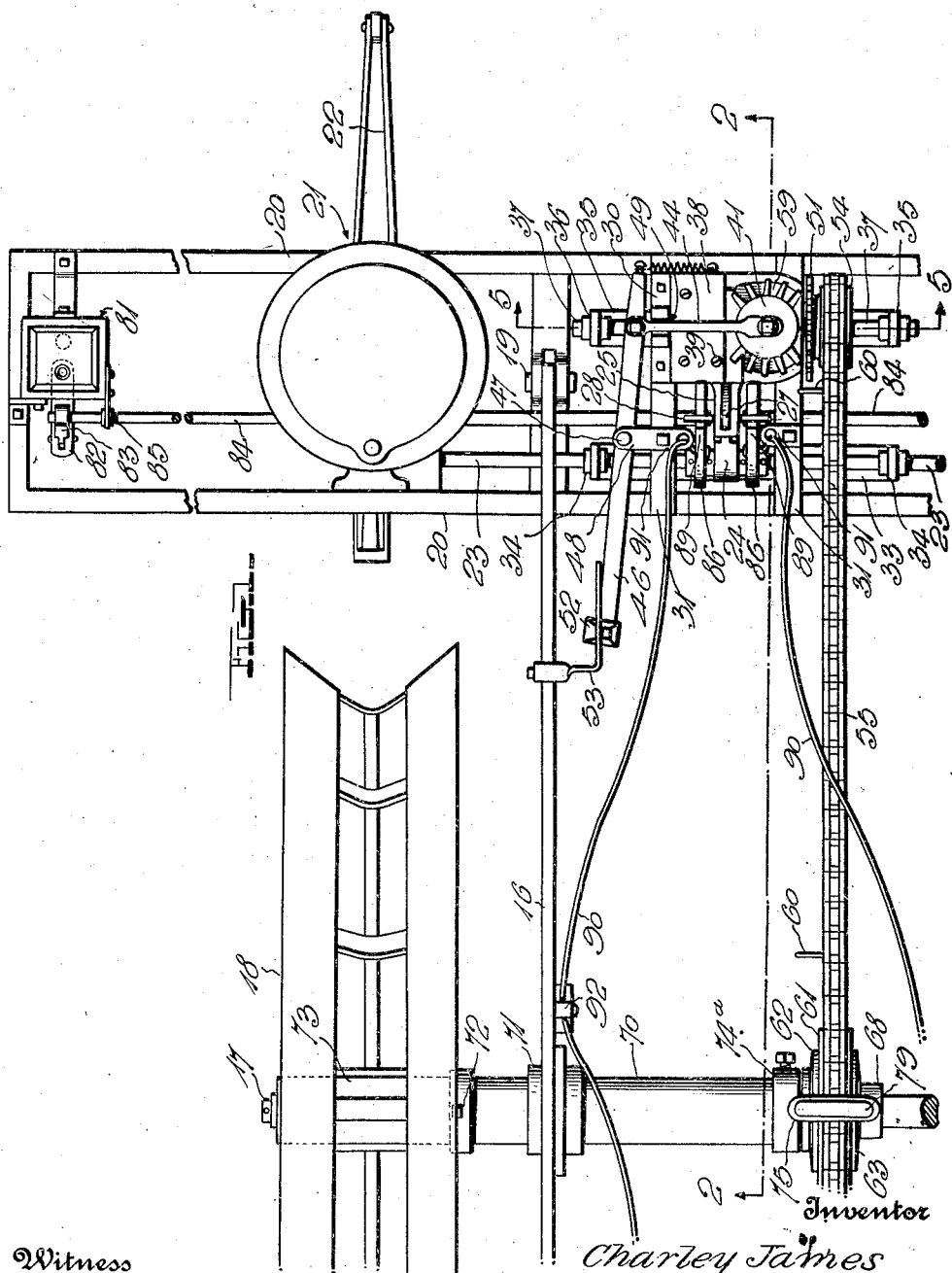
Witness
H. Woodard
Inventor
Charley James
By H. B. Willson & Co.
Attorneys

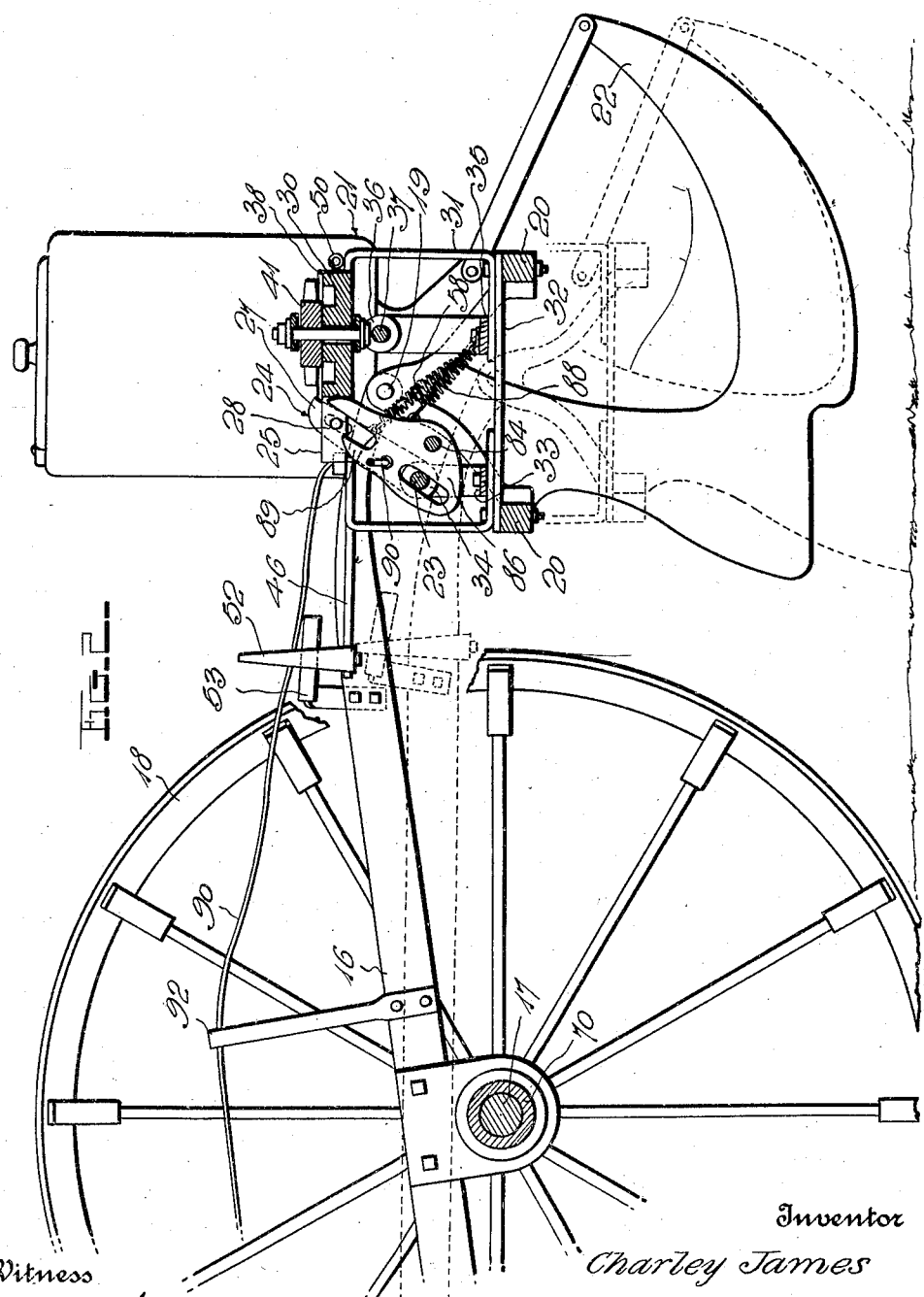

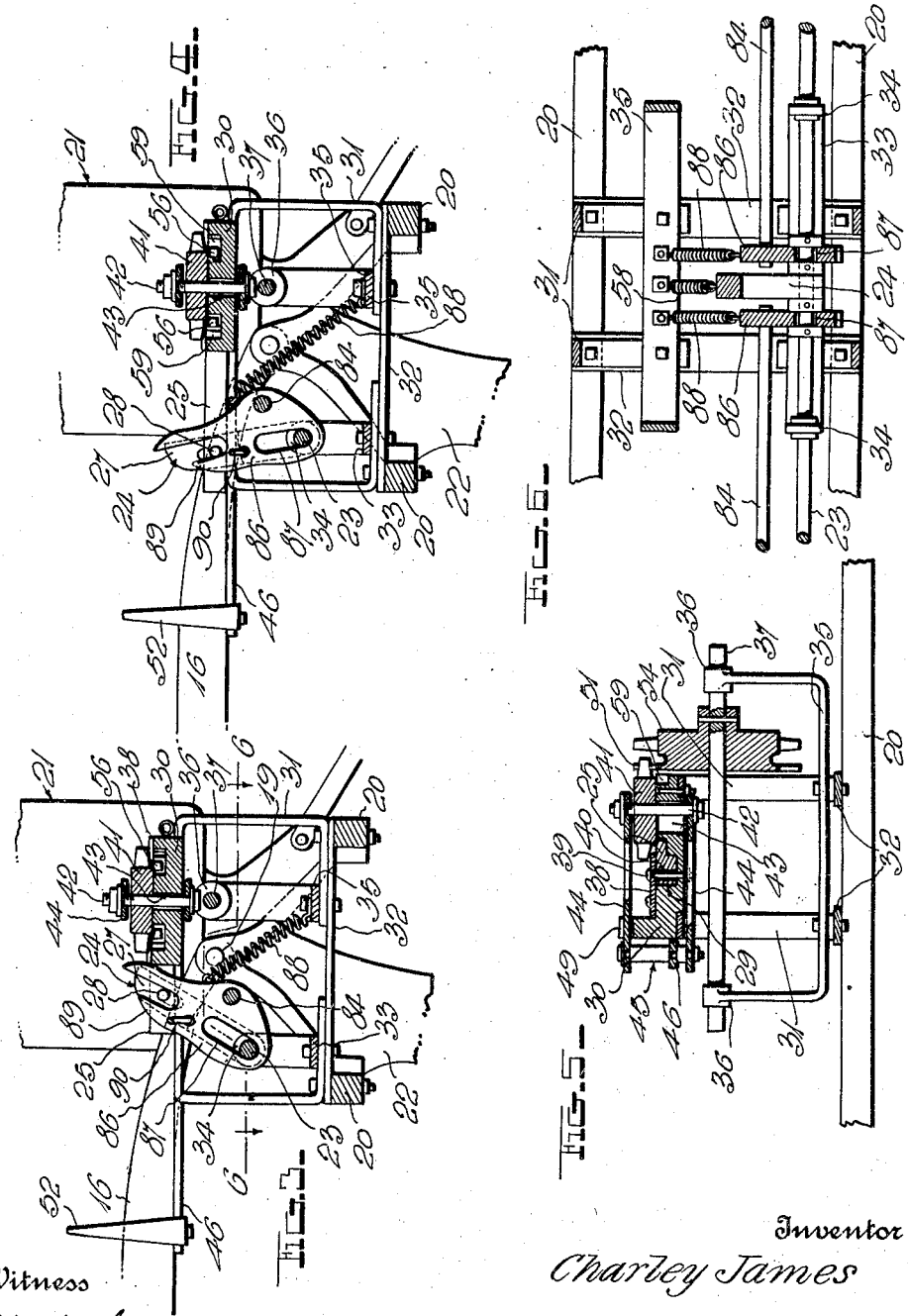

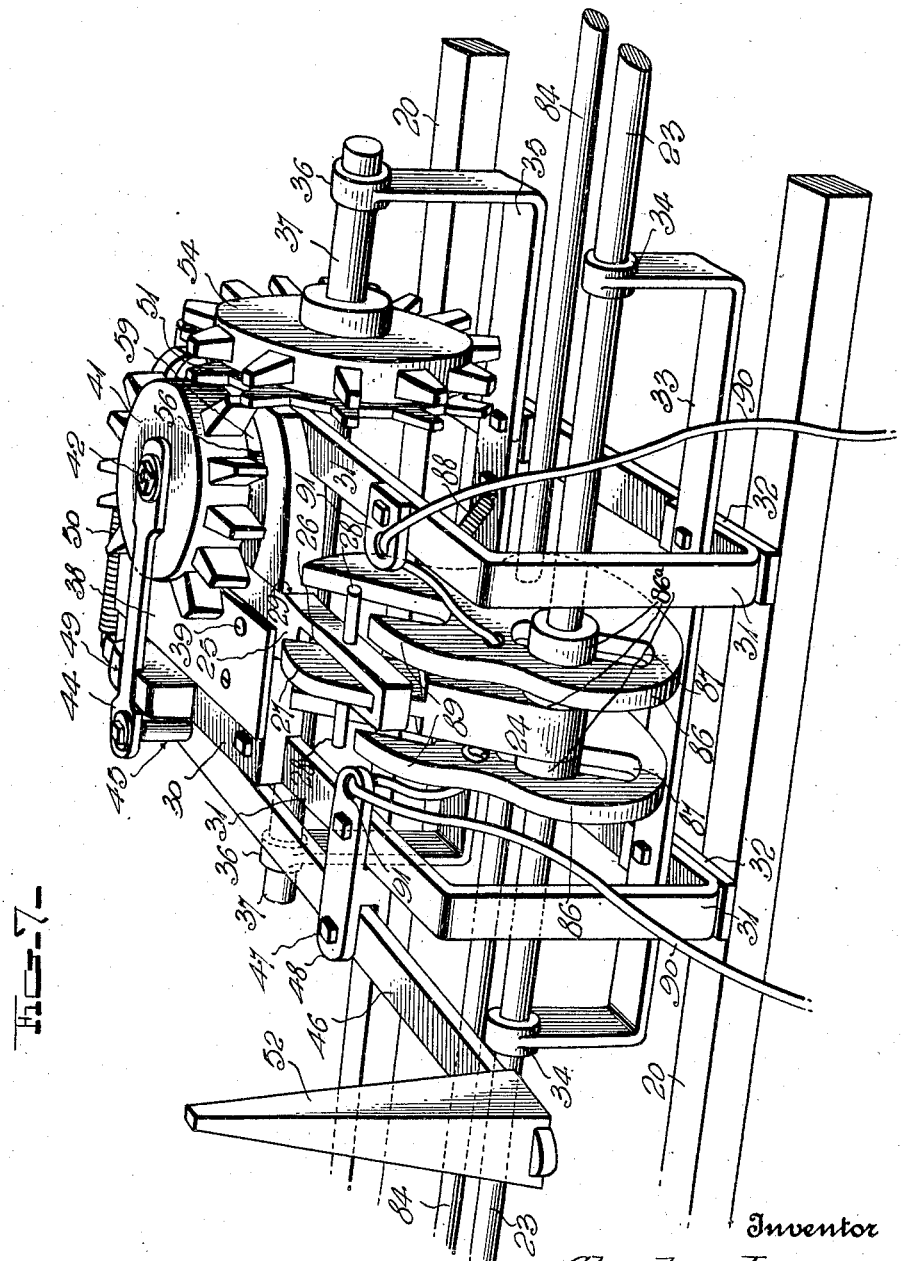

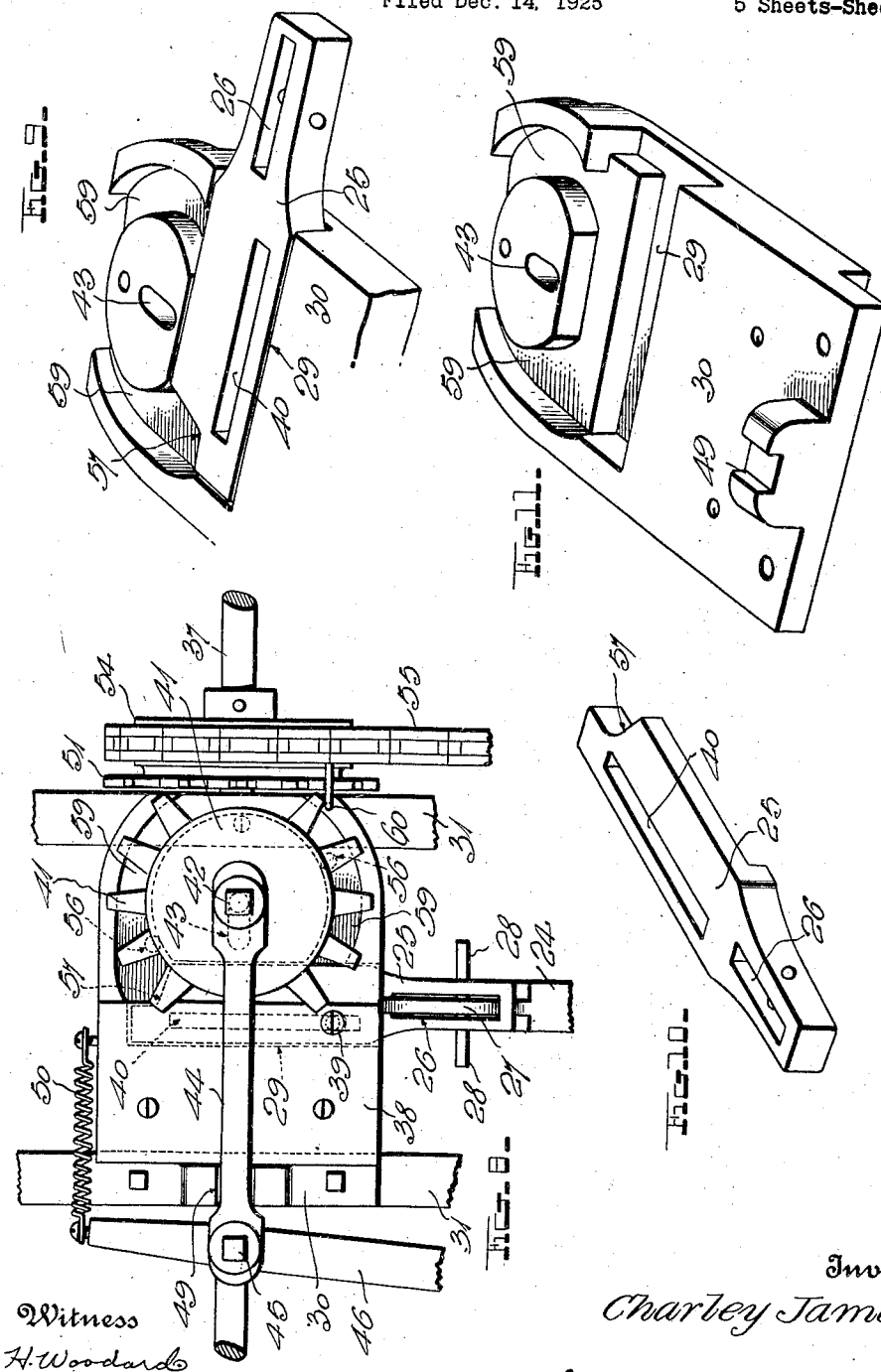

Patented Aug. 23, 1927.

1,640,238

UNITED STATES PATENT OFFICE.

CHARLEY JAMES, OF CORYDON, IOWA.

CORN PLANTER.

Application filed December 14, 1925. Serial No. 75,372.

This application relates to improvements in planters of the type used primarily for planting corn but often employed for the planting of other seed, and it is to be understood that regardless of language hereinafter used, the invention is not restricted to the planting of corn.

The most common types of corn planters make use of a check wire which is stretched across the field for the purpose of operating the seed dropping mechanism to plant the hills at points alined both longitudinally and transversely of such field, and while I am aware that other machines have been devised in which the seed dropping mechanism is actuated from a wheel or wheels of the planter, it is one of the principal objects of my invention to provide a new and improved machine operating on this general principle.

In machines of the type referred to, markers have been employed to form a slight cavity in the ground at the end of each trip across the field, assisting in properly setting the seed dropping mechanism for the next return trip. The great majority of these markers however have produced an indicating mark of such proportions as to prevent accurate transverse alinement of the hills of corn. A further object of my invention therefore, is to provide new and improved means for producing the required indicating mark, by dropping a few grains of seed or if desired, other indicating elements upon the ground at a point alined with the last two hills dropped by the planter at the end of any trip, the relation of parts being such that the seed or the like thus dropped, forms an accurate indicator for properly setting the machine for the return trip.

A still further object is to provide a novel construction in which the marking or auxiliary seed dropping means, is driven by a portion of the actuating mechanism for the two hill planting units of the machine, provision being made whereby the operator may readily control the actuation of the auxiliary seed dropping unit.

A still further aim is to provide a machine which will be rather simple and inexpensive, yet will be highly efficient and may be easily operated.

With the foregoing in view, the invention resides in the novel subject matter hereinafter described and claimed, the description being supplemented by the accompanying drawings.

Figure 1 is a partial top plan view of a planter embodying my improvements.

Figure 2 is a longitudinal sectional view as indicated by line 2—2 of Fig. 1, the movable arm which operates the auxiliary seed dropping means, being disposed at its normal inoperative position.

Figure 3 is a detail sectional view similar to a portion of Fig. 2 but showing the operating arm for the auxiliary dropping means, raised in readiness to be actuated by an arm on the operating shaft for the main seed dropping unit.

Figure 4 is a view similar to Fig. 3 but illustrating the manner in which the one arm operates the other.

Figure 5 is a detail transverse sectional view as indicated by line 5—5 of Fig. 1.

Figure 6 is a horizontal section taken substantially on line 6—6 of Fig. 3.

Figure 7 is a perspective view showing the greater part of the actuating mechanism for the two hill-planting units and the auxiliary seed dropping means.

Figure 8 is a top plan view of a portion of the mechanism shown in Fig. 7.

Figure 9 is a perspective view illustrating a slide which is instrumental in operating both the main and auxiliary seed dropping mechanisms, this slide being shown positioned in the guideway of its supporting member.

Figure 10 is a perspective view of the slide removed from the supporting member.

Figure 11 is a perspective view of the supporting member with the slide removed.

The details of construction herein disclosed, may be considered as preferred, it being of course understood however that numerous variations may be made, even though the construction shown, will be hereinafter specifically described.

16 designates the main frame of the planter, said frame having wheeled supporting means consisting of a transverse axle 17 and a pair of wheels 18, one of these wheels being loose upon the axle while the other is secured to the latter, in the usual manner. The front end of the frame 16 turns downwardly and is pivoted at 19 to a transversely elongated auxiliary frame 20, this frame being provided with the usual hill-planting units, disposed in front of the wheels 18. While only one of these units and one wheel have been shown, it is of course understood that the others are employed. The hill-dropping unit which has been illustrated, is designated at 21 and it includes the usual earth-slitting shoe 22. Any desired means (not shown) is provided for relatively angling the frames 16 and 20 in the manner shown in Fig. 2, so as to move the shoe 22 out of engagement with the earth, and when this is done, the seed dropping mechanism is automatically thrown out of play in a manner to be hereinafter described.

Extending between the two hill-planting units 21, is a rock shaft 23 which is connected therewith in the usual way to produce dropping of the seed, when the shaft is oscillated. Shaft 23 is provided with a crank arm 24 whose upper end is connected with a longitudinally disposed slide 25. In establishing this connection, I prefer to form the slide 25 with a slot 26 receiving the reduced upper end 27 of the arm 24, a pivot pin 28 being passed through both the arm and the slide. For a purpose to appear, this pin projects laterally in opposite directions from the slide 25.

The slide 25 is received in a guideway 29 formed in the upper side of a supporting plate 30. This plate is bolted or otherwise secured upon two vertically disposed, rectangular frames 31 which are in turn secured to the auxiliary frame 20 of the machine. The frames 31 include bottom bars 32 disposed longitudinally of the machine, and secured to the rear portions of these bars, I have shown a transverse bar 33 having upwardly directed ends provided with bearings 34 for the shaft 23. Secured to the front portions of the bars 32, is another transverse bar 35 having upwardly directed ends which are provided with bearings 36. In these bearings 36, a short transverse shaft 37 is mounted, said shaft extending under the supporting member 30.

Secured upon the supporting member or plate 30 and overlying the slide 25, is a retaining plate 38 for said slide, one of the fasteners 39 which secure the plate 38 in place, passing through a longitudinal slot 40 in said slide, so as to hold this slide against accidental withdrawal from the guideway 29 when assembling or disassembling the machine.

A mutilated gear 41 lies slidably and rotatably upon the support 30 at one side of the slide 25, the shaft 42 upon which said gear rotates, passing through a slot 43 in said support and being connected at its upper and lower ends with links 44, the outer ends of these links being pivotally connected by any desired means 45, with a lever 46 which is disposed longitudinally of the machine, said lever being fulcrumed between its ends at 47 to a bracket 48, the latter being secured to and projecting outwardly from one of the frames 31. If desired, plate 30 may be formed with a guide member 49 for the uppermost link 44. The two links 44 are normally slid inwardly by a suitable spring 50, so as to dispose the mutilated gear 41 in operative relation with a driving gear therefor, this driving gear being designated at 51. When the lever 46 however, is moved in the proper direction, it pulls upon the links 44, thus moving the gear 41 out of operative relation with the driving gear 51. This is accomplished when the main and auxiliary frames of the machine are angled in the manner shown in Fig. 2, upon raising of the shoe 22 from the ground. To accomplish this result, the rear end of the lever 46 is provided with a cam 52 which is co-operable with an arm or the like 53 secured to the frame 16 (see Figs. 1 and 2). When the auxiliary frame 20 is lowered to dispose the shoe 22 at its operative position, the arm 53 does not prevent lever 46 from so moving as to position the mutilated gear 41 for co-operation with the driving gear 51, as will be clear from Fig. 1. However, as soon as the frames 16 and 20 are relatively angled in the manner shown in Fig. 2, the arm or the like 53 engages the cam 52 and effects shifting of the lever 46, so as to move the gear 41 away from the gear 51.

The gear 51 is rotatably mounted upon the shaft 37 above referred to and it is either integral with or otherwise secured to a sprocket wheel 54 also mounted on the shaft 37. Trained around this sprocket wheel is a sprocket chain 55 which is driven by a sprocket 61. When the gear 51 is in mesh with the mutilated gear 41, it turns the latter, and tappets 56 on the lower side of this gear 41, engage a shoulder 57 on the slide 25, so as to move the latter and swing the arm 24 in one direction, said arm being returned after the action of each tappet, by an appropriate spring 58. The supporting plate 30 is formed with runways 59 in which the tappets operate.

As soon as a portion of the mutilated gear 41, devoid of teeth, reaches a position opposite the gear 51, the two gears disengage and the driving gear 51 continues to rotate, while the mutilated gear remains idle until its operation is required to effect dropping of the next hills of seed, it being understood that each time this gear rotates and actuates the slide 25 and arm 24, the latter turns the shaft 23 and causes the hill-planting units 21 to function. To again move the gear 41 into mesh with the gear 51, at the proper time, I provide the chain 55 with a suitable number of laterally projecting pins 60 which may pass between teeth of said gear 51 and engage a tooth of the gear 41, as shown in Fig. 8. When any pin thus engages the gear 41, the latter is initially turned so that it will mesh with the gear 51 and be driven by the latter until the next mutilated portion of said gear arrives at such a position as to throw the two gears again out of mesh.

The parts bearing the numbers 62 to 80, inclusive, are remote features of construction not claimed herein, for driving and adjusting the sprocket 61.

Two auxiliary seed-dropping units 81 are mounted at the ends of the auxiliary frame 20, only one of these units being shown. This unit is transversely alined with the seed-outlets of the units 21 and is spaced laterally therefrom a distance substantially equal to half the distance between said units 21. To operate the seed-dropping slide or the like 82 of the unit 81, a crank arm 83 has been shown, projecting downwardly from a transverse rock shaft 84, one of these shafts being of course employed for each of the units 81. The outer ends of these shafts may be loosely supported in bearings 85, while their inner ends have rigidly attached thereto, a pair of crank arms 86, these arms being disposed at opposite sides of the arm 24 and having slots 87 through which the shaft 23 passes. Collars 86ª on the shaft 23, hold the arms 86 against movement longitudinally of said shaft and as these arms are rigidly attached to the shafts 84, they hold the latter against movement in the direction of their length. The arms 86 are received between the collars 86ª, with a sufficient degree of looseness to permit vertical sliding of said arms for a purpose to hereinafter appear. Springs 88 are connected with the arms 86 to normally slide them downwardly so that they are out of the rearward path of the pin 28 above described. When the arms 86 are raised by a pull on rope 90, from the position shown for instance in Figs. 2 and 7, to the position of Fig. 3, projecting fingers 89 on said arms 86 are in the rearward path of said pin 28. Thus, upon the next rearward movement of the arm 24, to effect hill-planting, the arm 86 which has been raised in the path of the pin 28, will be rearwardly swung to the position shown in Fig. 4. Thus, the shaft 84 connected with this arm 86, will be turned sufficiently to actuate the slide 82 of the auxiliary seed-dropping unit 81 causing it to drop a number of grains of seed upon the ground. This auxiliary seed-dropping operation is effected only at the end of each trip across the field, and the grains of corn or the like thus dropped, will be positioned in alinement with the last two hills planted by the machine and will be spaced from one of said hills a distance substantially equal to that between said last two hills. Thus, when the machine is turned around and the auxiliary unit 81 is positioned directly over the grains of corn which it previously dropped, the operator knows that the machine should plant its first two hills. He then adjusts sprocket 61 to cause the machine to effect this initial hill-planting operation. After this, the checking of the corn will be automatic as the machine is drawn across the field.

Any desired means may be employed for raising either of the arms 86 into operative relation with the pin 28. I prefer however to connect two small ropes 90 with said arms, said ropes passing through appropriate guides 91 on the frames 31 and extending rearwardly within reach of the driver. Other guides 92 may be employed for these ropes, these guides being secured to the frame 16, and I prefer to connect the rear ends of the ropes with hand levers (not shown).

It will be seen from the foregoing that I have produced a rather simple and inexpensive, yet an efficient and reliable mechanism for planting seed so that it is alined in hills both transversely and longitudinally of the field. The machine requires little attention and the checking of the corn is automatically effected without the necessity of employing a check wire. Ordinarily of course, the auxiliary seed-dropping units 81 do not function, but either of them may be brought into operation when the planter is planting the last two hills upon any trip across the field. Thus, the grains dropped by the unit 81 will form effective guiding means for insuring proper setting of the planter upon the next return trip.

I claim:

1. In a wheeled check-row corn planter, laterally spaced hill-planting units, a rock shaft extending between said hill-planting units and having an arm, wheel-driven means for rocking said shaft, an auxiliary seed-dropping unit spaced laterally from one of said seed-planting units to an extent substantially equal to half the distance between said seed-planting units, said auxiliary seed-dropping unit being adapted only for dropping seed on top of the ground, a second rock shaft substantially parallel with the first named shaft and connected with said auxiliary seed-dropping unit to operate the latter, a second arm on said second shaft disposed adjacent the first named arm, a projection on said first named arm which normally clears the second arm, and manually controlled means for moving said second arm in position to be struck and moved by the projection on said first named arm.

2. A structure as specified in claim 1; said second named arm having a slot through which the first named shaft passes, said slot permitting the necessary manual movement of the second arm and serving to hold one end of the second named shaft in operative relation with the first named shaft.

In testimony whereof I have hereunto affixed my signature.

CHARLEY JAMES.